(12) United States Patent
Li et al.

(10) Patent No.: US 8,166,458 B2
(45) Date of Patent: Apr. 24, 2012

(54) METHOD AND SYSTEM FOR AUTOMATED DISTRIBUTED SOFTWARE TESTING

(75) Inventors: Richard Ding Li, Somerville, MA (US); William F. Peck, Douglas, MA (US); Adriaan van de Ven, Boekel (NL)

(73) Assignee: Red Hat, Inc., Raleigh, NC (US)

( * ) Notice: Subject to any disclaimer, the term of this patent is extended or adjusted under 35 U.S.C. 154(b) by 1193 days.

(21) Appl. No.: 11/267,276

(22) Filed: Nov. 7, 2005

(65) Prior Publication Data

US 2007/0168970 A1  Jul. 19, 2007

(51) Int. Cl.
*G06F 9/44* (2006.01)
*G06F 15/173* (2006.01)

(52) U.S. Cl. ........ 717/124; 717/127; 717/131; 709/223; 709/226

(58) Field of Classification Search .................. 717/124, 717/120, 127, 130; 718/102; 709/223, 226; 714/38.1, 38.14, 4.1
See application file for complete search history.

(56) References Cited

U.S. PATENT DOCUMENTS

| | | | |
|---|---|---|---|
| 7,337,431 B1* | 2/2008 | Barnes et al. .................. | 717/124 |
| 7,343,587 B2* | 3/2008 | Moulden et al. ............... | 717/124 |
| 7,404,106 B2* | 7/2008 | Swoboda ........................ | 714/30 |
| 7,441,241 B2* | 10/2008 | Dawson et al. ............... | 718/102 |
| 7,490,322 B2* | 2/2009 | Pichetti et al. ................. | 717/170 |
| 2001/0012986 A1* | 8/2001 | Conan et al. .................. | 702/188 |
| 2003/0098879 A1* | 5/2003 | Mathews ....................... | 345/762 |
| 2003/0131285 A1* | 7/2003 | Beardsley et al. .............. | 714/38 |
| 2003/0196190 A1* | 10/2003 | Ruffolo et al. ................. | 717/124 |
| 2004/0010778 A1* | 1/2004 | Kaler et al. .................... | 717/130 |
| 2004/0015856 A1* | 1/2004 | Goward et al. ............... | 717/120 |
| 2004/0049362 A1* | 3/2004 | Volkov et al. ................. | 702/119 |
| 2004/0128651 A1* | 7/2004 | Lau ................ | 717/124 |
| 2004/0143819 A1* | 7/2004 | Cheng et al. .................. | 717/125 |
| 2005/0034103 A1* | 2/2005 | Volkov ........................... | 717/124 |
| 2005/0066310 A1* | 3/2005 | Creamer et al. .............. | 717/127 |
| 2005/0097515 A1* | 5/2005 | Ribling .......................... | 717/124 |
| 2005/0223362 A1* | 10/2005 | Whitlock et al. ............. | 717/126 |
| 2006/0064399 A1* | 3/2006 | De Sio ............................. | 707/1 |
| 2006/0075407 A1* | 4/2006 | Powers et al. ................. | 718/100 |
| 2006/0271931 A1* | 11/2006 | Harris et al. ..................... | 718/1 |

\* cited by examiner

*Primary Examiner* — Emerson Puente
*Assistant Examiner* — Charles Swift
(74) *Attorney, Agent, or Firm* — Lowenstein Sandler PC

(57) ABSTRACT

Embodiments of the present invention provide methods and systems for automated distributed testing of software. A testing service may utilize a distributed architecture that provides a standardized framework for writing tests, scheduling the tests, and gathering and reporting results of the tests. Multiple distributed labs are integrated into the testing service and their environments can be centrally managed by the testing service. The testing service permits the scheduling and performance of tests across multiple machines within a test lab, or tests that span across multiple test labs. Any of the machines in the test labs may be selected based on variety of criteria. The testing service may then automatically locate the appropriate machines that match or satisfy the criteria and schedule the tests when the machines are available. The testing service may also automatically create and set up a desired test environment according to the desired specifications for the test.

25 Claims, 5 Drawing Sheets

METHOD AND SYSTEM FOR AUTOMATED DISTRIBUTED SOFTWARE TESTING

DESCRIPTION OF THE INVENTION

1. Field of the Invention

The present invention relates generally to testing of computer systems, and more particularly, methods and systems for automated distributed software testing.

2. Background of the Invention

Software testing can require a significant amount of development time, computer and human resources, and effort. For example, software testing may involve numerous tasks ranging from ensuring correct coding syntax, and checking the output of a software program. In addition, software testing typically requires tests for each processor, each operating system, each driver, and so forth, of interest when the software is required to work across a range of platforms. Accordingly, software testing is costly and time consuming.

There are several known test tools that are available to help perform software testing. For example, there are several tools that assist in automating software testing, such as tools that help create a test script. A test script is used to create a test and tests the software on various computers. Unfortunately, the known test tools are inflexible or cumbersome to use. As a result, most tests are performed manually on an ad-hoc basis.

In addition, it is difficult to gather and maintain the wide variety of platforms having the processor, operating system, etc. of interest. Even if a sufficient number of platforms could be gathered, scheduling tests on them still presents a challenge.

Accordingly, it may be desirable to provide systems and methods that automate the creation and performance of tests across a desired spectrum of platforms. In addition, it may be desirable to provide an efficient way of scheduling tests across a number of different processors, operating systems, drivers, configurations, and so forth, and which provides test results in an easy to use format.

SUMMARY OF THE INVENTION

In accordance with one feature invention, a method of testing software is provided. A request to conduct a test is received. Requirements of the test are then identified based on information in the request. At least one test lab is determined based on whether the test lab includes a target machine that satisfies at least some of the requirements of the test. The test is scheduled with the at least one test lab. Information that indicates results of the test may then be received.

In accordance with another feature invention, a distributed testing system is provided and may comprise a plurality of test labs and a control server. The plurality of test labs may comprise a set of configurable target machines, and a sentry server that monitors the set of configurable target machines. The control server is coupled to the plurality of test labs and configured to track capabilities of the set of configurable target machines, schedule tests to be performed in the plurality of test labs, and provide the sentry server constraints on the tests to be performed in the plurality of test labs.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Embodiments of the present invention provide methods and systems for automated distributed testing of software. In particular, a testing service may utilize a distributed architecture that provides a standardized framework for writing tests, scheduling the tests, and gathering and reporting results of the tests. Multiple distributed labs are integrated into the testing service and their environments can be centrally managed by the testing service. A test lab may comprise one or more configurable test machines that can be treated as a logical group. A test lab also may contain local supporting infrastructure for testing, such as a sentry server, a control server, a test repository server, and/or a results server.

The testing service enables specific tests to run against a selected set of machines in one or more of the test labs. For example, the testing service permits the scheduling and performance of tests across multiple machines within a test lab, or tests that span across multiple test labs. Any of the machines in the test labs may be selected based on variety of criteria. The testing service may then automatically locate the appropriate machines that match or satisfy the criteria and schedule the tests when the machines are available. The testing service may also automatically create and set up a desired test environment according to the desired specifications for the test. For example, the testing service may retrieve and install various packages of software and versions of operating systems for a test.

The testing service may support manually generated tests or automated tests that are triggered by another system based on pre-determined criteria. Furthermore, the testing service may monitor the progress of the test and gather any results that are requested. If a test causes a machine to fail, then the testing service may intervene and terminate the test.

Figure 1:
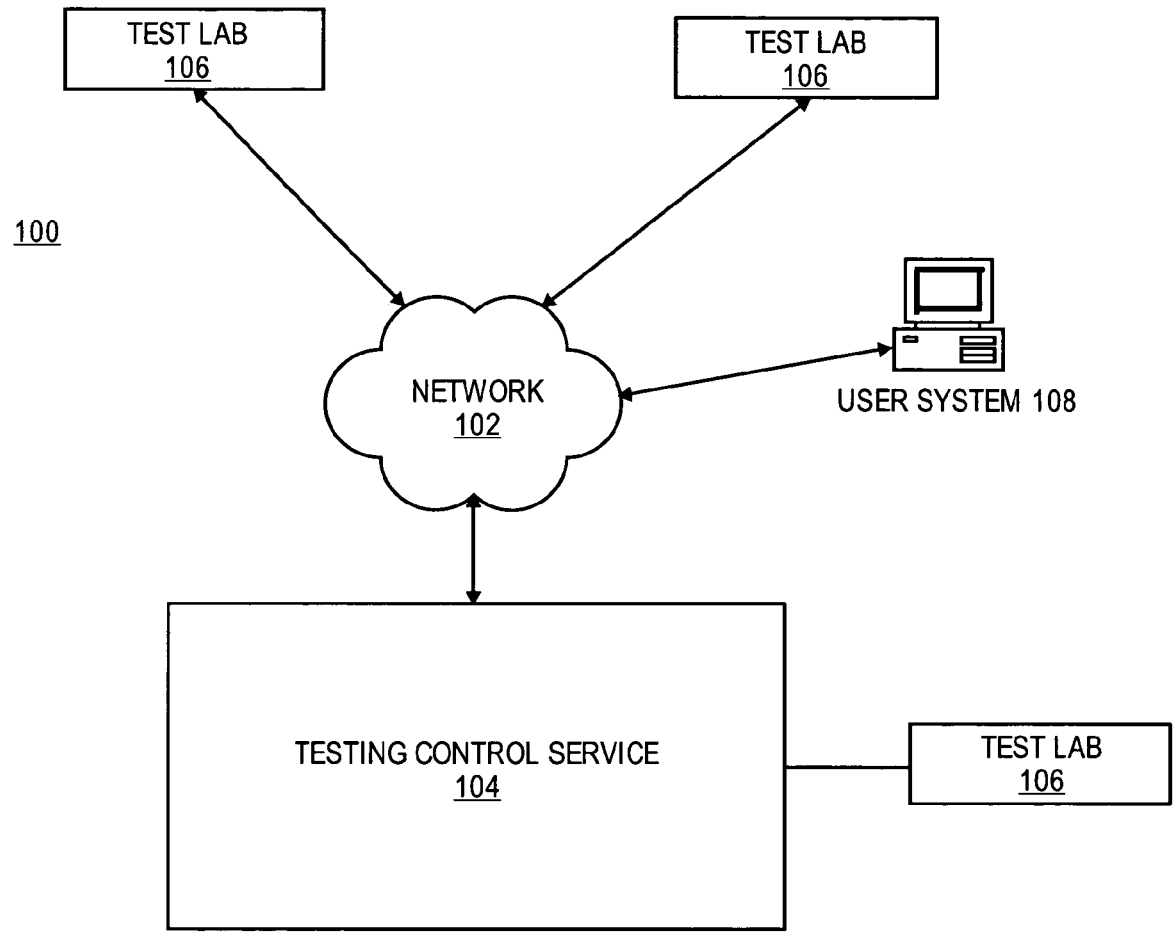
FIG. 1 shows an exemplary system for automated distributed testing of software that is in accordance with embodiments of the present invention.
Figure 2:
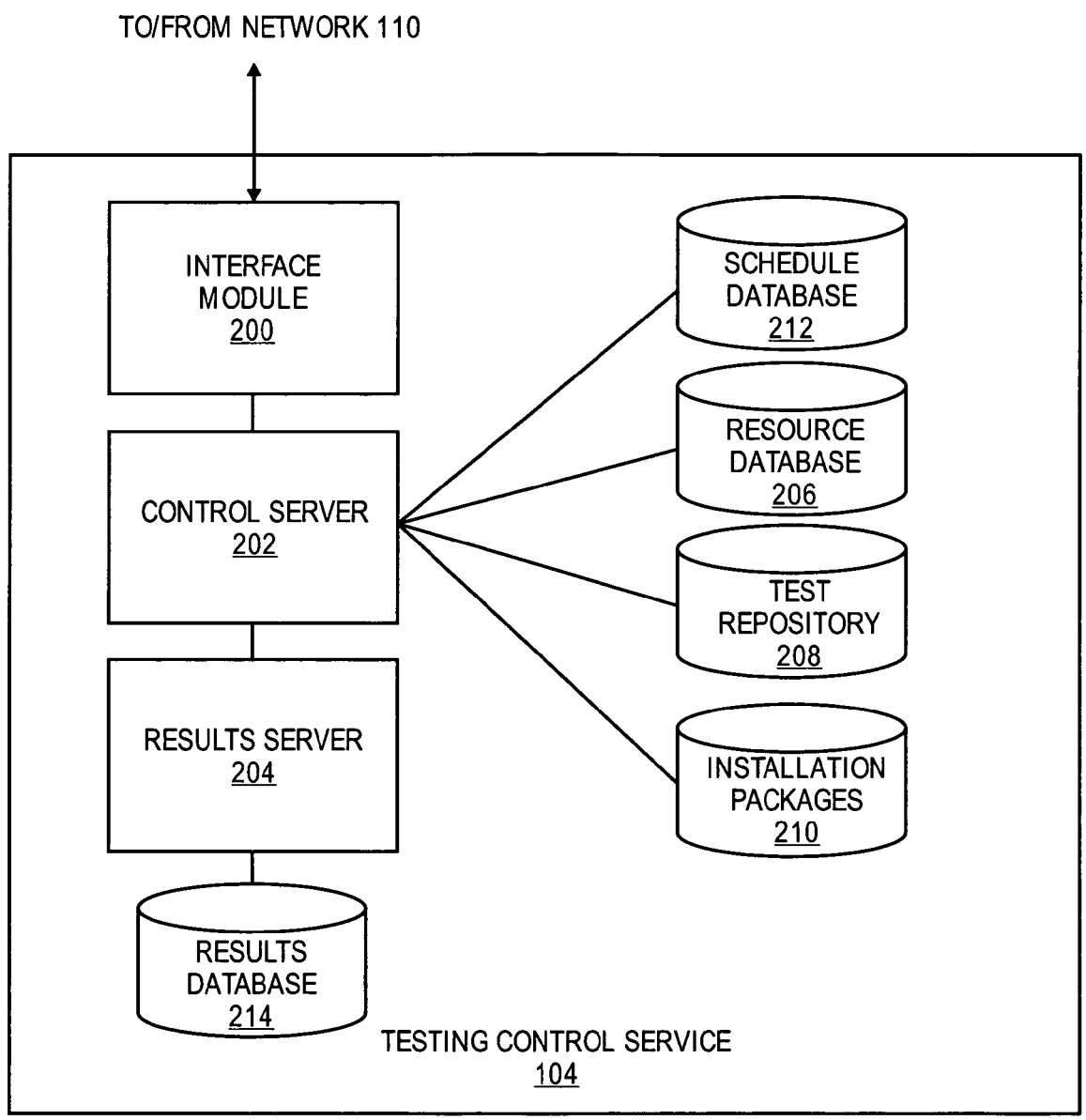
FIG. 2 shows an exemplary architecture of a testing control service that is in accordance with embodiments of the present invention.
Figure 3:
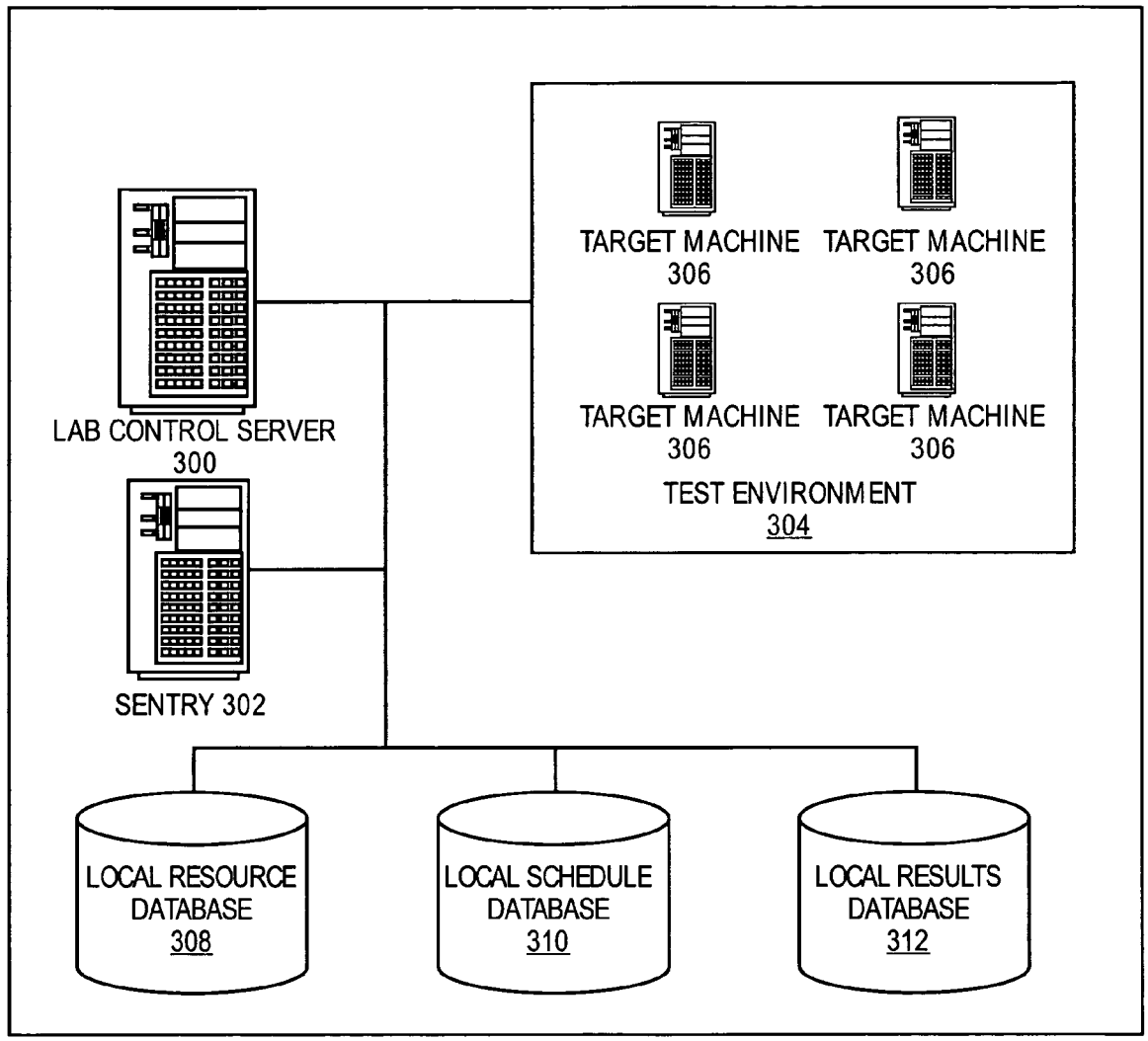
FIG. 3 shows an exemplary test lab that is in accordance with embodiments of the present invention.
Figure 4:
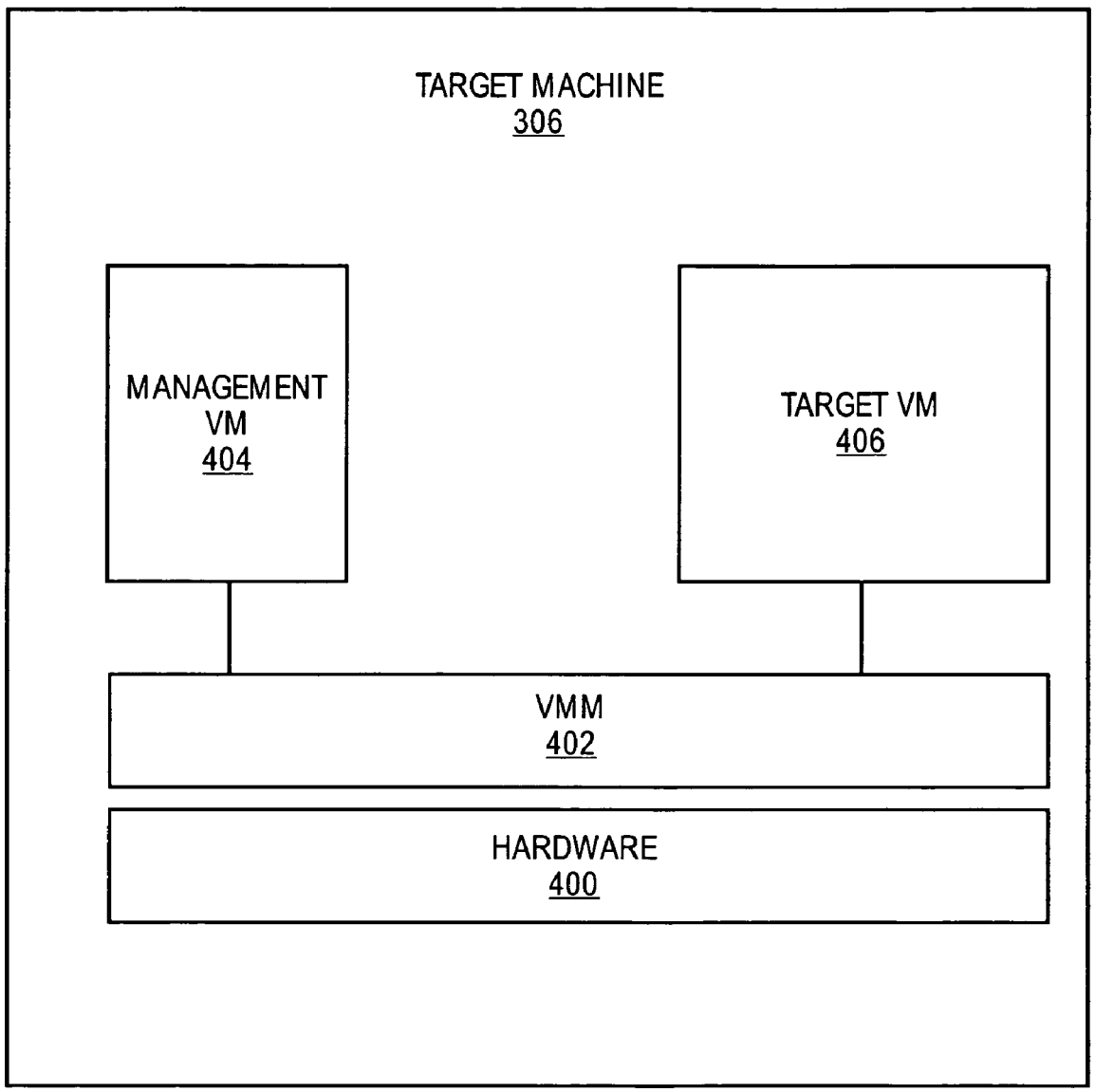
FIG. 4 shows an exemplary target machine that is in accordance with embodiments of the present invention.
Figure 5:
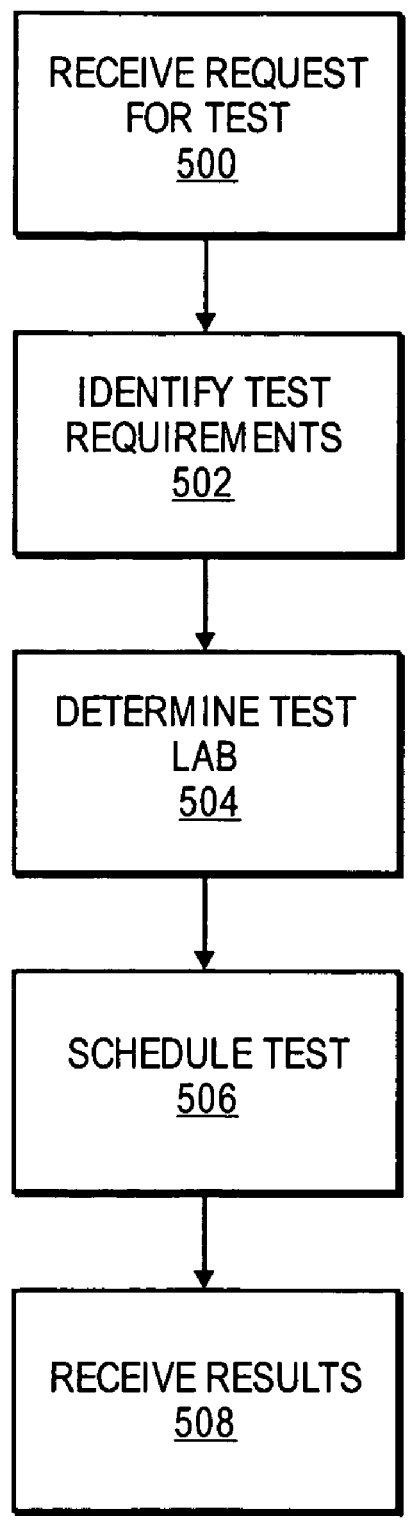
FIG. 5 shows an exemplary process flow that is in accordance with embodiments of the present invention.

Reference will now be made in detail to embodiments of the invention, examples of which are illustrated in the accompanying drawings. FIGS. 1-2 illustrate generally the systems that may be used to test software in accordance with the principles of the present invention. FIG. 1 shows an exemplary system for testing software. FIG. 2 shows an exemplary architecture for the testing service. FIG. 3 shows an exemplary architecture of for a test lab and FIG. 4 shows an exemplary architecture of a target machine in the test lab. Lastly, FIG. 5 illustrates an exemplary process for testing software that is consistent with the principles of the present invention. Wherever possible, the same reference numbers will be used throughout the drawings to refer to the same or like parts.

FIG. 1 shows a system 100 for automated distributed testing of software that is in accordance with embodiments of the present invention. As shown, the system 100 may comprise a network 102, a test control service 104, a set test labs 106, and one or more user systems 108. These components of system 100 may be implemented using well-known hardware, software, firmware and the like. Each of these components and their general functions will now be briefly discussed below.

Network 102 provides a communication infrastructure that generally permits system 100 to have a distributed architecture. Network 102 may be implemented based on known topologies and components. For example, network 102 may be implemented based on one or more local area networks, such as an Ethernet network, a wide area network, the Internet, or the like. The various entities of system 100 may be located in proximity to one another via a local area network, an intranet, and the like. Of course, network 102 may have a scope that permits system 100 to have components virtually anywhere in the world. Thus, even though they may be remote from each other, the various components of system 100 can remotely access each other to perform software testing.

Test control service 104 allows users to test a wide variety of target machines in any of test labs 106. Test control service 104 may provide several functions including support for writing tests, scheduling tests, assisting in the performance of tests, gathering results from the tests, and providing access to results in a test performed.

Test control service 104 may include a library of tests and test scripts that a previously written. Accordingly, the test control service 104 may provide a platform for sharing and assisting in the drafting of tests and their associated test scripts.

Test control service 104 may also support automated scheduling of tests once they've been submitted. Test control service 104 may use any of a wide variety of known algorithms to schedule these test. For example test may be scheduled based on a signed priority, when they were submitted, the components they affect, and machines required by the test. One skilled in the art will recognize that anyone or combination of well-known algorithms may be used in accordance with embodiments of the present invention. An exemplary implementation of test control service 104 is also described with reference to FIG. 2.

Test labs 106 provide a platform and environment for running some or all the test on behalf of test control service 104. Test labs 106 may support various functions such as installing software required for the test, initiating and performing the test, and collecting gathering results of the test. An exemplary implementation of a test lab is also described with reference to figure three.

Test labs 106 may be implemented anywhere in the world. For example, a software vendor or a hardware vendor may implement a test lab 106 at their location. In addition a testing organization, such as a third-party testing service, may also implement a test lab 106. One skilled in the art will recognize that system 100 may comprise any number of test labs 106.

The specific requirements and configuration for a test lab 106 that complies with the framework of system 100 may be provided in various forms. For example, the entity managing test control service 104 may publish or distribute a set of requirements such as minimum equipment required, administration requirements, and the like. Test labs 106 may also be separately certified before being integrated into system 100.

User system 108 is shown to generally illustrate that a user may access test control service 104 and perform testing and any of test labs 106. User system 108 may be implemented based on well-known hardware and software. For example user system 108 may be a personal computer or an automated system. Of course, one skilled in the art will recognize that system 100 may comprise any number of user systems 108.

FIG. 2 shows an exemplary architecture of a testing control service 104 that is in accordance with embodiments of the present invention. As shown, testing control service 104 may comprise an interface module 200, the control server 202, and a result server 204. These components may be implemented using well-known equipment, such as a general-purpose computer or server. In addition, testing control service 104 may comprise one or more databases of information for providing a testing framework. These databases of information may be implemented using well-known equipment and database management systems. For example, testing control service 104 may implement one or more relational databases that are accessible using the well known structured query language (SQL) queries. Other types of equipment and database structures are also well-known to skilled in the art. In particular, testing control service 104 may comprise a resource database 206, a test repository 208, installation package database 210, a schedule database 212, and a results database 214. These components and databases will now be briefly described below.

Interface module 200 manages communications between testing control service 104 and the other components of system 100, such as test labs 106 and user system 108. For example, interface module 200 may be configured to periodically poll test labs 106 on a regular basis to request test information that may include testing results or operational data for various systems in test labs 112. As another example, interface module 200 may be configured to passively monitor for test information as it is output from test labs 106. Interface module 200 may be implemented based on well-known hardware and software and utilize well-known protocols, such as TCP/IP, hypertext transport protocol, etc.

Interface module 200 may be configured to handle a wide variety of data and may be in any format. For example, test information from test labs 106 may be in the form of an extensible markup language (XML) file or a network location, such as a uniform resource locater (URL) on the Internet. Alternatively, interface module 200 may be configured to obtain information from vendor 102 or testing organization 104 by searching the Internet to identify and locate which of test labs 106 has released testing results recently. Interface module 200 may then download this information into a database, such as results database 214, or store one or more network locations (URL) where the download can be obtained.

In addition, interface module 200 may provide one or more pages for authenticating the identity of a user or system, such as user system 108. For example, interface module 200 may be configured to check for items, such as a user ID, password, digital certificates, and the like. This information may be manually entered by a user, or may be automatically provided by user system 108 once a connection is established testing control service 104. Interface module 200 may be configured to collect other information, such as contact information, a mailing address, an email address, and payment information. Of course, interface module 200 may also provide instructions and a process for registering a new entity or enterprise that wishes to participate with testing control service 104.

In some embodiments, interface module 200 is configured to assist in the writing of test in test scripts. In particular interface module 200 may be configured to access test repository 208 and installation packages database 210 and provide an interface or shell that assists and writing tests in test scripts. Of course the test may be retrieved from other locations other than test control service 104. For example, the user requesting a test may provide a test and test script, or specify location for this information can be retrieved. In addition, interface module 200 may assist a user or user system 108 and specifying a set of software, such as one or more applications and a version of an operating system, for creating an appropriate environment for the test. Subsequently, this installation package may be downloaded to target machine in one or more of test labs 106 to create the desired test environment.

Control server 202 determines the resources required for the test, locates these resources in test labs 106, and automatically schedules the tests in test labs 106. Control server 202 may determine the resources required based on information specified in the test ended in the test script. Typical information that may be determined for test by control server 202 may include items such as processors, memory requirements, operating system versions, applications, and the like. Control server 202 may then query resource database 206 to locate appropriate machines in test labs 106 that can satisfy the requirements of the test.

Once resources are located, control server 202 will automatically schedule the test in test labs 106. When scheduling a test on target machines, control server 202 may consider a variety of factors. For example control server 202 may consider a priority assigned to the test, the components tested, when the test was submitted, the number of the tests involved, the scope of the test, the number of machines or test labs involves, and the like.

Results server 204 gathers the results of tests performed in test labs 112 and format these results so that they are easily accessible. In particular, result server 204 may gather results from test labs 106 has tests are performed were concluded. Results server 204 may also be configured to format these results into a standardized format so that various test can be easily accessed and reported. Such formats and data structures are well-known to skilled in the art.

Resource database 206 provides an inventory of the machines in test labs 106. Resource database 206 may track various characteristics of the machines in test labs 106, such as processor architectures, memory, network interface cards, and the like.

Test repository database 208 provides an archive of tests and test scripts for test control service 104. Test repository database 208 may organize this information in various ways. For example, test repository database 208 may track information, such as a name for the test, general group for the software being tested, names of the software being tested, a general description of the test, a path that identifies where the test should be stored, a bug that the test is directed towards (if appropriate), a maximum amount of time that the test should run, one or more releases or versions of operating systems that the test is directed towards, processor architectures of the tests, whether the test is a destructive, and type for the test, such as whether the test is regression test or functional test. Test repository database 208 may also comprise one or more "helper" packages. For example, the helper packages may include items, such templates for the test script.

Installation package database 210 comprises the software, installation packages, and scripts for creating a test environment. For example, installation package database 210 may include packages for one or more operating system releases, patches, one or more applications, and the like. Installation package database 210 may also comprise information identifying where an installation package can be retrieved, such as a URL.

Schedule database 212 includes the schedule information of when and where tests are being performed across test labs 106. Schedule database 212 may be formatted and sorted in various ways, such as by test lab, by machine characteristics, by date, by location, etc.

Results database 214 provides an archive of results of tests. In some embodiments, results database 214 formats the results such that they are easily sorted and accessed. Such formats and data structures are well known to those skilled in the art.

FIG. 3 shows an exemplary test lab 106 that is in accordance with embodiments of the present invention. As shown, test lab 106 may comprise a lab control server 300, a sentry 302, a test environment 304 having a set of target machines 306, a local resource database 308, a local schedule database 310, and a local results database 312. These components may be implemented using well known equipment, such as a general purpose computer or server. Each of these components will now be briefly described.

Lab control server 300 controls the operation of test lab 106. In particular, lab control server 300 tracks the inventory of test environment 304 and routes the test to target machines 306 in test environment 304 that are selected for the test. Lab control server 300 may also control when a target machine may be added or removed from test environment 304.

In addition, lab control server 300 may control the creation of the execution environment for a test by controlling the installation of the various installation packages for a test into target machines 306. Lab control server 300 may also modify the boot settings or re-boot target machines 306 as needed for a test.

Sentry 302 monitors the progress of the test as it is being performed in target machines 306. Sentry 302 may also be configured to ensure that a test does not exceed various constraints. For example, sentry 302 may monitor whether target machines 306 have failed during a test. Sentry 302 may also monitor when a test has been executing beyond its maximum allotted time and terminate the test on target machines 306. Sentry 302 may then report this event (or failure and/or lack of an event) to lab control server 300 and/or testing control service 104. Sentry 302 may further be configured to ensure that target machines are allocated in accordance with the schedule determined by testing control service 104.

Test environment 304 provides an execution environment for executing the tests. As noted, lab control server 300 may create test environment 304 by installing various packages onto target machines 306. One skilled in the art will recognize that test environment 304 may comprise any number of target machines 306. In addition, test environment 304 may be configured to communicate with test environments in other test labs of system 100. Accordingly, system 100 may support tests that span not only multiple target machines 306, but multiple test labs 106.

Local resource database 308 provides a local version of the inventory of target machines available in that test lab. In some embodiments, local resource database 308 is formatted in a similar or consistent manner to resource database 206. Of course, other well known database management systems may be utilized based on the specific characteristics of test lab 106. For example, a test lab 106 may comprise a relatively small number of target machines 306, and thus, a simple table or list may be sufficient as local resource database 308. Of course, local resource database 308 may be sized appropriately if test lab 106 comprises a larger number of target machines 306.

Local schedule database 310 provides a local copy of schedule database 212. Local schedule database 310 may comprise the schedule of only a single test lab 106. Alternatively, local schedule database 310 may provide some information about the schedule of other test labs 106.

Local results database 312 provides a local cache of results of tests being performed in test environment 304. Local results database 312 may store results in any known format. In some embodiments, local results database 312 may store results according to data structures that are consistent with results database 214. Alternatively, local results database 312 may store its results in a proprietary or native format that is later migrated to standard format when copied to results database 214. For example, in some embodiments, test lab 106 may comprise a local results server (not shown) that gathers results as a test is being performed within test environment 304. Accordingly, one skilled in the art will recognize that test lab 106 may be implemented with various levels of testing infrastructure to include servers for controlling tests, gathering results, and the like. Alternatively, test lab 106 may be part of a test system that employs a global control server (like control server 202), a global result server (like results server 204). However, embodiments of the present invention may support a wide variety of architectures for test lab 106.

FIG. 4 shows one exemplary target machine 306 that is in accordance with embodiments of the present invention. In general, target machine 306 may be implemented using a general purpose computer and the like. For example, target machine 306 may comprise hardware 400 that comprises items, such as a processor, cache, memory, network interface card, etc. Such equipment is well known to those skilled in the art. In addition, in order to support transitions from one test to another, target machine 306 may include virtualization software. In particular, target machine 306 may comprise a virtual machine monitor 402, a management virtual machine 404, and a target virtual machine 406. These components will now be briefly described.

Virtual machine monitor (VMM) 402 is the software responsible for virtualizing hardware 400 and target machine 306 into logically separate virtual machines, such as virtual machines 404 and 406. Accordingly, this allows a target machine 306 to perform a test, while at the same being monitored by an external agent, such as lab control server 300 or sentry 302, without interfering with the progress of the test.

VMM 402 may be a thin layer of software that runs on a host operating system that directly accesses hardware 400. VMM 402 may virtualize various hardware resources of hardware 400 and allow multiple virtual machines, such as virtual machines 404 and 406, to transparently multiplex the resources of hardware 400.

Management virtual machine (VM) 404 tracks the operational status of target VM 406. For example, management VM 404 may directly examine for information, such as memory and register contents, and I/O device flags, to determine the operational status of target VM 406. Management VM 404 may also collect results of the test as it is being performed by target VM 406. These results may include information about: all the processes currently running on target VM 406; processes which are currently holding sockets; contents of virtual memory; and contents of the task structure for a particular process; processor utilization; and the like. In addition, management VM 404 may provide certain administrative functions related to managing target machine 306, such as logging events, providing remote access, configuration management, and communications. These functions are well known to those skilled in the art.

Target VM 406 may be referred to as the "target" virtual machine because it is the virtual machine that performs the test. The operating system running inside of target VM 406 and applications running may be specified based on the requirements of the test. As noted, target VM 406 may be configured based on one or more installation packages that have been installed. These installation packages may include packages configured to install well known operating systems, such as Mac OS by Apple Computer, Open VMS, LINUX, AIX by IBM, Java and Sun Solaris by Sun Microsystems, Windows by Microsoft Corporation, Microsoft Windows CE, Windows NT, Windows 2000, and Windows XP. In addition, target VM 406 may be configured using installation packages that are existing, pre-configured disk images and included with a test environment. Although FIG. 4 depicts a single management VM 404 and target VM 406, one skilled in the art will recognize that target machine 306 may implement any number of virtual machines.

FIG. 5 shows an exemplary process flow that is in accordance with embodiments of the present invention. In stage 500, testing control service 104 receives a request via interface module 200 to conduct a test. As noted, a user or user system 108 may request a test. The test may be formatted based on retrieving information from test repository 208. For example, a pre-existing test or test suite may be reused. Test repository 208 may include tests from a variety of sources. The request may be in various forms, such as a formatting a package that identifies an appropriate location in test repository 208 and a target of the test. The request may also include a shell script that specifies the actions for a test. Processing may then flow to stage 502.

In stage 502, control server 202 identifies requirements of the test. In particular, control server 202 may parse the request and identify the various parameters requested in the test. Typical requirements that may be identified by control server 202 include processor architecture, software package groups, application programs, and operating system release version. Processing may then flow to stage 504.

In stage 504, control server 202 determines at least one of test labs 106 having one or more target machines 306 that satisfy at least some of the requirements of the test. In particular, control server 202 may query resource database 206 to identify various target machines 306 that satisfy requirements of the test. From the information in resource database 206, control server 202 may identify which of test labs 106 include the appropriate target machines 306. Processing may then flow to stage 506.

In stage 506, control server 202 schedules the test with the at least one of test labs 106. In particular, control server 202 may query schedule database 212. From the query, control server 202 may then determine which of test labs 106 and target machines 306 are the most appropriate for scheduling the test. As noted, control server 202 may schedule the tests on various target machines 306 using a variety of algorithms and factors. For example, control server 202 may select those target machines 306 that are currently available or available the soonest. Control server 202 may also determine a relative priority and scope of a test in deciding how to schedule a test. Once control server 202 has schedule the test, it may retrieve various packages from installation package database 210 and send the test to the selected one or more test labs 106. Processing may then flow to stage 508.

In stage 508, test lab 106 performs the test. In particular, lab control server 300 will process the information from testing control service 104 and determine which of target machines 306 to route the test. Lab control server 300 may then install the necessary software in to target machines 306 to create the appropriate test environment 304 for performing the test. Lab control server 300 may query local resource database 308 in determining where to route the test and how to create test environment 304. Target machine 306 may then execute the test using target VM 406. Lab control server 300 may also update local schedule database 310. Processing may then flow to stage 510.

In addition, while the test is being performed, sentry 302 may monitor the progress of the test. For example, sentry 302 may periodically retrieve information from management VM 404 to determine the operational status of target VM 406. If target VM 406 has failed or its operations have exceeded the time limit, then sentry 302 may terminate the operations of target VM 406. For example, sentry 302 send a command to management VM 404 that suspends the operations of target VM 406. Target VM 406 may then be rebooted or shut down.

In stage 510, testing control service 104 receives the results of the test. In particular, as target VM 406 performs the test, results may be collected. For example management VM 404 may collect the test results as the test is being performed. Alternatively, target VM 406 may log the test results in a file that is transferred to local results database 312.

Lab control server 300 may then retrieve the test results from local results database 312 and transmit them to testing control service 104. Lab control server 300 may notify testing control server 104 that results are ready to be transferred and then transfer the results. Of course, one skilled in the art will recognize that other protocols may be used in migrating results from test lab 106 to testing control service 104.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of testing software, said method comprising:
receiving, at a testing control service that comprises a server, a request to conduct a test of software;
identifying, by the testing control service, test parameters to test the software from the request, wherein the test parameters comprise requirements of testing the software;
identifying a remote test lab from a plurality of remote tests labs, the remote test lab comprising a plurality of target machines comprising resources that satisfy the requirements of the test, wherein each target machine comprises a virtual machine monitor, at least one target virtual machine to perform the test, and a management virtual machine to track the at least one target virtual machine performing the test;
scheduling the test with the plurality of target machines of the remote test lab;
connecting to a sentry server machine located at the remote test lab, wherein the sentry server machine is configured to monitor whether the test resulted in at least one target machine of the remote test lab failing by periodically retrieving information from the management virtual machine in a target machine; and
receiving information from the sentry server machine that indicates a result of the test at the remote test lab.

2. The method of claim 1, further comprising determining a cost to conduct the test in the remote test lab.

3. The method of claim 1, wherein an operating system running inside a target virtual machine is based on the requirements of the test.

4. The method of claim 1, wherein the requirements of the test comprise at least one of a name assigned to the test, a description of the test, a location for storing results of the test, an architecture that is appropriate for the test, a release of an operating system that is appropriate for the test, and a maximum amount of time for which the test should execute.

5. The method of claim 1, wherein identifying the remote test lab comprising the plurality of target machines comprising resources that satisfy the requirements of the test comprises:
determining a load of each target machine of the set of the plurality of target machines; and
selecting at least one target machine from the set of the plurality of target machines based on its respective load.

6. The method of claim 1, further comprising:
receiving a request to add an additional target machine to the remote test lab;
determining a configuration of the additional target machine; and
adding the additional target machine to the remote test lab based on the configuration.

7. The method of claim 1, wherein the test at the remote test lab comprises a full test on a full application stack conducted at the remote test lab.

8. A distributed testing system, said system comprises:
a plurality of test labs, wherein each of the test labs comprises:
a set of configurable target machines, wherein each target machine comprises a virtual machine monitor, at least one target virtual machine to perform a test of software, and a management virtual machine to track the at least one target virtual machine performing the test, and
a local sentry server machine configured to monitor the set of configurable target machines and determine whether a scheduled test results in at least one target machine failing by periodically retrieving information from the management virtual machine in a target machine; and
a control server coupled to the plurality of test labs and configured to receive a request to conduct the test at one of the plurality of test labs, identify test parameters to test the software from the request, wherein the test parameters comprise requirements of testing the software, identify capabilities of the set of configurable target machines in the one of the plurality of test labs, determine that the set of configurable target machines comprise resources that satisfy the requirements of the test, schedule the test to be performed on the set of configurable target machines of the one of the plurality of test labs, and provide the local sentry server machine with a constraint on the test to be performed.

9. The system of claim 8, wherein the local sentry server is further configured to monitor a progress of the test being performed in the one of the plurality of test labs without interrupting the progress of the test by retrieving information from the management virtual machine in a target machine.

10. The system of claim 8, wherein the one of the plurality of test labs comprises a local results server configured to gather results of the test from the set of configurable target machines in the one of the plurality of test labs.

11. The system of claim 8, wherein the local sentry server is further configured to interrupt the test on each target machine in the set of configurable target machines in response to an event by sending a command to the management virtual machine in a target machine.

12. The system of claim 8, wherein the local sentry server machine is further configured to monitor a progress of the test on each target machine in the set of configurable target machines by retrieving information from the management virtual machine in a target machine and interrupt the test on each target machine in the set of configurable target machines in response to a failure of an event by sending a command to the management virtual machine in a target machine.

13. The system of claim 8, wherein the control server is further configured to schedule the test based on an availability of the set of target configurable machines in the one of the plurality of test labs.

14. The system of claim 8, wherein the control server is further configured to schedule the test on a plurality of target machines across the plurality of test labs.

15. The system of claim 8, wherein the control server is further configured to gather information from the one of the plurality of test labs in response to an error generated during the test by retrieving information from the management virtual machine in a target machine.

16. The system of claim 8, wherein the control server is further configured to create an installation package for the test that is installed on target machines of the set of configurable target machines that are scheduled to perform the test.

17. The system of claim 8, further comprising a results server configured to gather a result of the test performed in the one of the plurality of test labs.

18. The system of claim 8, further comprising a results server configured to gather a result of the test performed in the one of the plurality of test labs from a local results server associated with the one of the plurality of test labs.

19. The system of claim 8, further comprising a results server configured to gather a result of the test performed in the one of the plurality of test labs and format the result according to a format.

20. The system of claim 8, further comprising a results server configured to gather a result of the test performed in the one of the plurality of test labs and report a test failure.

21. The system of claim 8, further comprising a test repository server configured to provide a previous test that was previously performed in the one of the plurality of test labs.

22. The system of claim 8, further comprising a test repository server configured to provide a template for the test.

23. The system of claim 8, further comprising a test repository server configured to provide a helper package that assists in configuring the test.

24. A method of testing software, said method comprising:
receiving, at a remote test lab of a plurality of remote test labs comprising a plurality of target machines, a request to schedule a test on a target machine in the remote test lab, wherein the request is received in response to a remote testing control service generating a test script for the test, wherein the test script comprises requirements of the test, and determining that the target machine comprises resources that satisfy the requirements of the test, wherein the target machine comprises a virtual machine monitor, at least one target virtual machine to perform the test, and a management virtual machine to track the at least one target virtual machine performing the test;
locally monitoring the target machine in the remote test lab, by a sentry server machine, during the test to determine whether the test results in the target machine fail by retrieving information from the management virtual machine in the target machine; and
sending, to the remote testing control service, information indicating that the target machine failed.

25. A computer readable storage medium including instructions that, when executed by a computer, cause the computer to perform a method comprising:
receiving a request to conduct a test of software;
identifying, by the computer, test parameters to test the software from the request, wherein the test parameters comprise requirements of testing the software;
identifying a remote test lab from a plurality of remote test labs, the remote test lab comprising a plurality of target machines comprising resources that satisfy the requirements of the test, wherein each target machine comprises a virtual machine monitor, at least one target virtual machine to perform the test, and a management virtual machine to track the at least one target virtual machine performing the test;
scheduling the test with the plurality of target machines of the remote test lab;
connecting to a sentry server machine located at the remote test lab, wherein the sentry server machine is configured to monitor whether the test resulted in at least one target machine of the remote test lab failing by periodically retrieving information from the management virtual machine in a target machine; and
receiving information from the sentry server machine that indicates a result of the test at the remote test lab.

* * * * *